C. A. HAGADONE.
TRUCK MECHANISM FOR HARVESTING MACHINES.
APPLICATION FILED JAN. 27, 1913.

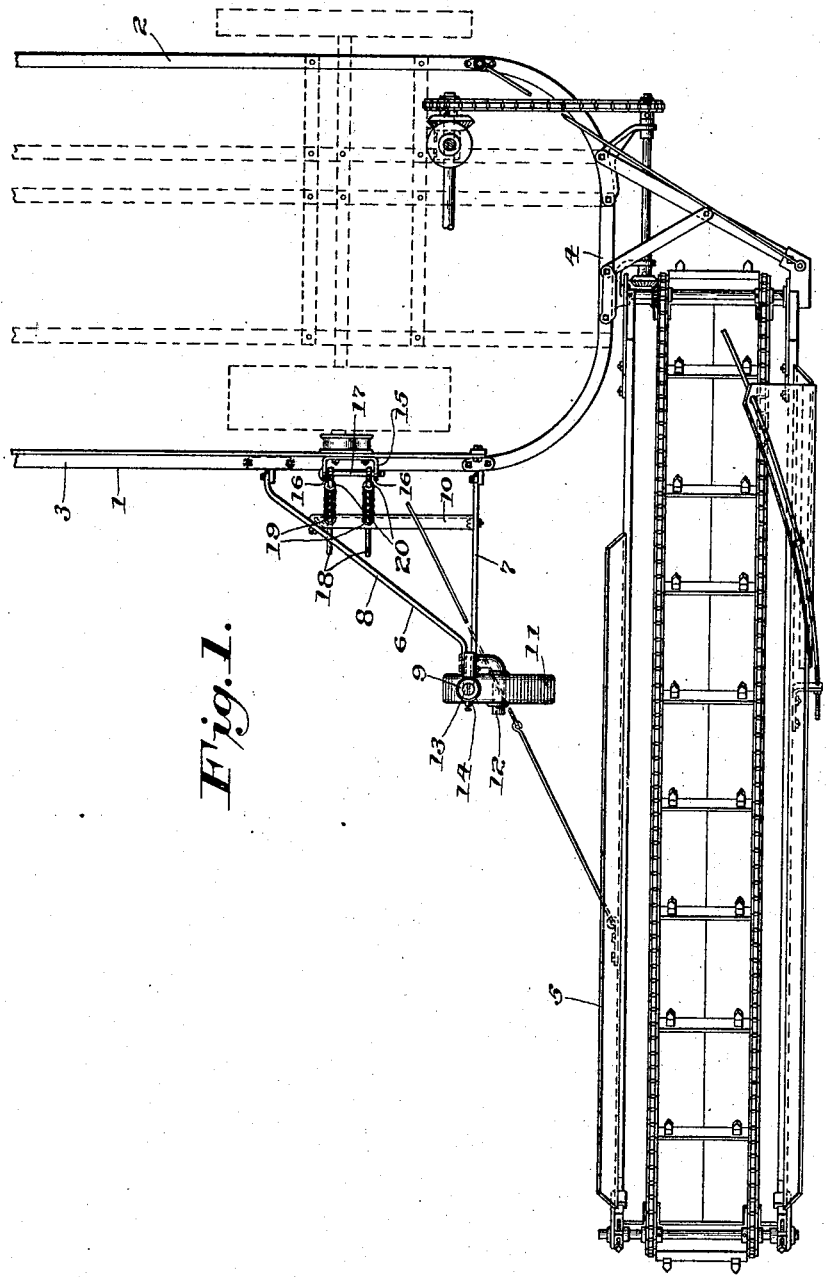

1,188,444.

Patented June 27, 1916.
2 SHEETS—SHEET 2.

Witnesses:
C. C. Palmer
F. W. Hoffmeister

Inventor.
Clinton A. Hagadone,
By Chas. E. Lord
Atty.

UNITED STATES PATENT OFFICE.

CLINTON A. HAGADONE, OF WESTERN SPRINGS, ILLINOIS, ASSIGNOR TO INTERNATIONAL HARVESTER COMPANY OF NEW JERSEY, A CORPORATION OF NEW JERSEY.

TRUCK MECHANISM FOR HARVESTING-MACHINES.

1,188,444.  Specification of Letters Patent.  Patented June 27, 1916.

Application filed January 27, 1913. Serial No. 744,399.

*To all whom it may concern:*

Be it known that I, CLINTON A. HAGADONE, a citizen of the United States, residing at Western Springs, in the county of Cook and State of Illinois, have invented certain new and useful Improvements in Truck Mechanism for Harvesting-Machines, of which the following is a full, clear, and exact specification.

My invention relates to means for supporting a harvesting machine, such as a corn harvester, having a laterally projecting carrier connected therewith and extending stubbleward from the traction wheel; the weight of the carrier having a tendency to rock the harvester laterally, and consists in providing a caster wheel mechanism that is yieldingly connected with the frame of the harvester in a manner to swing in a vertical plane transverse to the line of draft of the machine; the object of my invention being to provide a mechanism that will maintain a proper balance of the machine and yieldingly accommodate itself to an uneven ground surface over which the machine may travel. These objects are attained by means of mechanism, one embodiment of which is illustrated in the accompanying drawings, in which—

Figure 3:
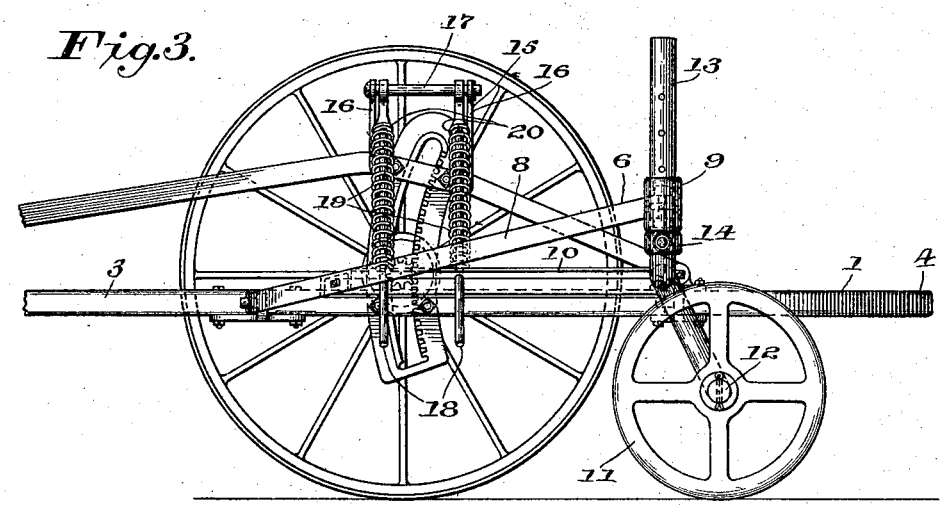
Figure 2:
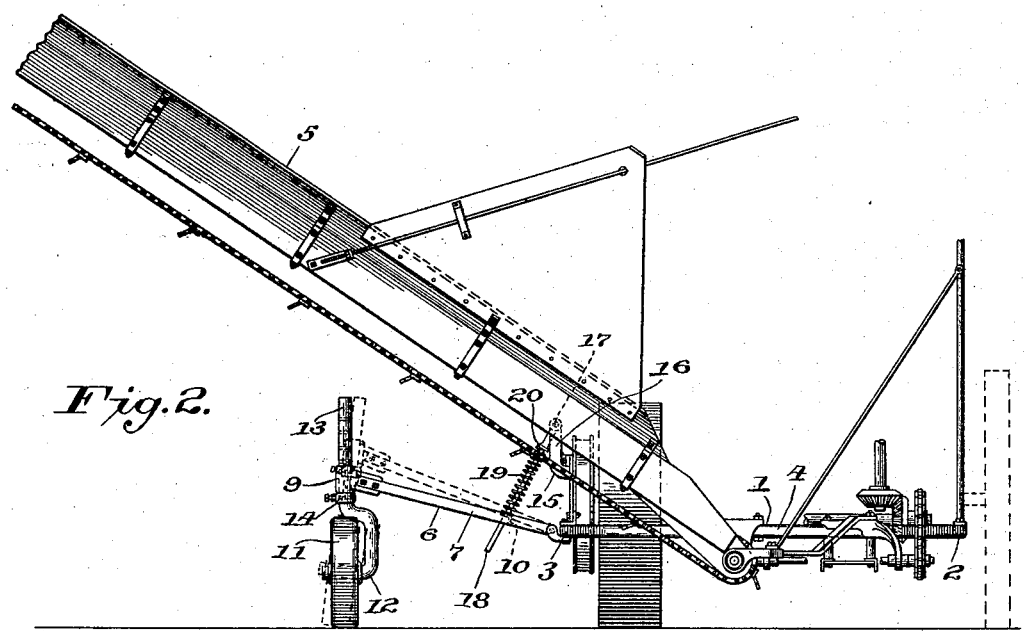

Figure 1 is a top plan view of the wheeled frame of corn harvesting machine having a laterally extending sheaf carrier and elevator connected therewith, and my improved truck mechanism forming a part thereof; Fig. 2 is a rear end elevation of Fig. 1; and Fig. 3 is a side elevation, on an enlarged scale, of a part of the wheeled frame of the harvester and the truck mechanism.

The same reference numerals designate like parts throughout the several views.

1 represents a part of the wheeled frame of a corn harvester comprising longitudinally arranged side members 2 and 3 upon the grainward and stubbleward sides of the machine, respectively, and a curved transverse portion 4 at the rear and preferably integral with the side members of the frame.

5 represents a bundle elevator attachment connected with the rear end of the wheeled frame and inclined stubbleward and upward. In the operation of the machine the elevator, with the additional weight of the material being conveyed, will have a tipping effect upon the wheeled frame, and to counteract such effect is the object of my invention.

6 represents a substantially triangular frame comprising a rear bar 7 extending laterally at right angles, more or less, to the line of draft of the machine, and having the grainward end thereof pivotally connected with the frame member 3 in a manner permitting the opposite end to rise and fall in a vertical plane relative to the wheeled frame; a front member 8 inclining rearward and stubbleward and having the grainward end thereof pivotally connected with the bar 3 in alinement with the axis of the rear bar 7.

9 represents a vertically arranged bearing block secured to the stubbleward ends of bars 7 and 8, and 10 a longitudinally arranged bar having opposite ends thereof secured to bars 7 and 8 near the inner ends thereof.

11 represents a caster wheel journaled upon an arm 12, that is provided with a vertically arranged stem portion 13 journaled in the bearing block 9, and 14 represents an adjustable collar that receives the stem and regulates the operative length thereof.

15 represents a bracket member secured to a fixed part of the wheeled frame and provided with upwardly extending arms 16 that are connected by means of a cross pin 17, and 18 represents links having the upper ends thereof provided with openings that loosely receive the pin 17, the opposite ends of said links being slidably received by openings in the bar 10, and 19 represents compression springs encircling the bodies of the links and operative between the bar 10 and shoulder portions 20 upon the links in a manner to yieldingly resist an upward swinging movement of the frame 6 or a tipping movement stubbleward of the wheeled frame of the machine.

While I have in this application described one form which my invention may assume in practice, it is, of course, to be understood that the same is not limited to the form shown herein, but may be modified without departing from its spirit.

What I claim as my invention, and desire to secure by Letters Patent, is:

1. In a grain harvester, the combination of a wheeled frame, a truck frame pivotally connected to one side of said wheeled frame, a caster wheel connected to said truck frame, and automatic means for preventing said wheeled frame from tipping.

2. In a grain harvester, the combination of a wheeled frame, a truck frame pivotally connected to one side of said wheeled frame, a caster wheel connected to said truck frame, and a connection between said frames to prevent tipping of one of them.

3. In a grain harvester, the combination of a wheeled frame, a truck frame pivotally connected to one side of said wheeled frame, a caster wheel connected to said truck frame, and a spring connection between said frames to prevent tipping of one of them.

4. In a grain harvester, the combination of a wheeled frame, a truck frame pivotally connected to one side of said wheeled frame, a wheel connected to said truck frame, a link having one end pivotally connected to said wheeled frame and the opposite end thereof slidably connected to said truck frame, and a spring surrounding said link and acting between said frames to prevent tipping of one of them.

5. In a grain harvester, the combination of a wheeled frame, a bundle elevator operatively connected to one portion of said frame tending to overbalance and tip the same, and a truck frame connected to said wheeled frame having means to automatically prevent tipping of said wheeled frame.

In testimony whereof I affix my signature, in the presence of two witnesses.

CLINTON A. HAGADONE.

Witnesses:
EDW. S. CHARLES,
WILLIAM WEBBER.

Copies of this patent may be obtained for five cents each, by addressing the "Commissioner of Patents, Washington, D. C."